Figure 1:
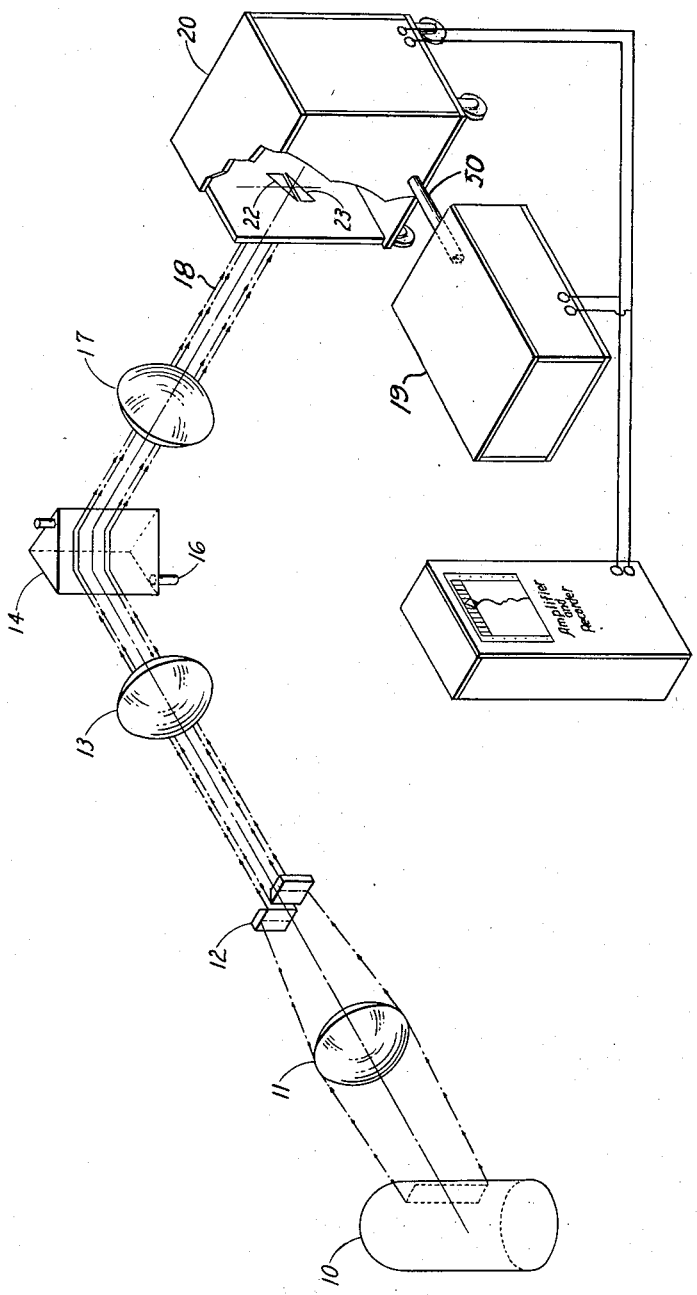

Aug. 18, 1953     S. E. J. JOHNSEN     2,649,014
APPARATUS FOR REFRACTOMETRY UTILIZING PHOTOELEMENTS
Filed Dec. 26, 1947     3 Sheets-Sheet 1

INVENTOR.
SHERMAN E. J. JOHNSEN
BY Herman O. Bauermeister

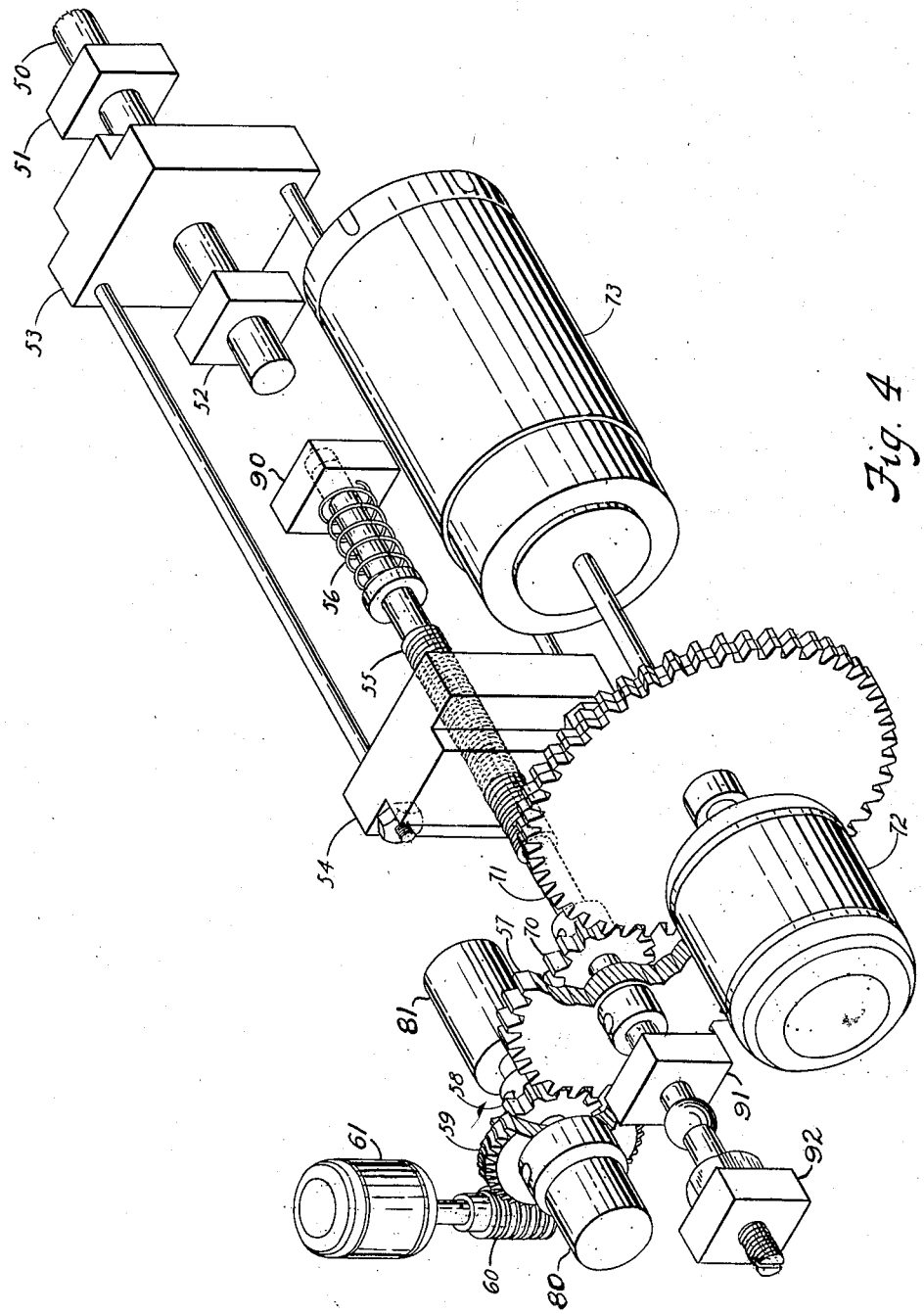

Patented Aug. 18, 1953

2,649,014

UNITED STATES PATENT OFFICE 2,649,014

APPARATUS FOR REFRACTOMETRY UTILIZING PHOTOELEMENTS

Sherman E. J. Johnsen, Texas City, Tex., assignor to Monsanto Chemical Company, St. Louis, Mo., a corporation of Delaware Application December 26, 1947, Serial No. 794,004

2 Claims. (Cl. 88—14)

This invention relates to the art of refractometry as applied to analytic and control purposes. An object of the invention is to apply a new method to the measurement of the index of refraction. A further object is to provide a new machine embodying such method.

One object of my invention is to measure in a new and novel manner the quality of certain chemical products by means of continuous indication of the refractive index during the course of manufacture of such products while in a fluid form, whereby the production of these materials in their most effective state is expedited to a high degree.

Another object of my invention is to avoid the difficulties sometimes arising in connection with liquid testing devices by reason of adherence of the test liquid, and the hardening thereof, on the test instrument parts, particularly as the result of polymerization, oxidation and heating which are entirely avoided in the present teaching.

A further object of my invention is to provide a liquid testing unit that shall be simple, and duravle in construction, economical to manufacture, continuous and effective in its operation and adaptable for operation in combination with control instruments and other means to regulate and control chemical processing operations.

In the manufacture of certain monomeric and low-polymer chemical products prior to their ultimate polymerization to obtain plastics and the like, it is important that certain qualities, particularly the degree of unsaturation of carbon chain molecules, be known precisely both as to degree and as to time. Heretofore, in executing tests to determine the above mentioned qualities, it has been usual to remove test samples of the liquid from the tanks or pipe lines in which they are being manufactured or pumped while undergoing a step in the process of manufacture. This procedure almost immediately renders the test sample different from the main body of the liquid remaining in the tank or flowing in said line, so that by the time the test is completed it is not a true criterion of the qualities of the liquid in the tank or the line.

It is my aim to overcome all of the disadvantages attending the testing of fluids of the above indicated character and to provide a compact, effective unit that shall be free of clogging, that shall permit accurate and substantially instantaneous determination of the refractive index of the liquids during manufacture without removing test samples from the production system, and that shall be an improvement in general over all prior instruments, of which I am aware.

The refractive index is a fundamental property of any material, and one which is particularly characteristic and adaptable to show differences in certain organic compounds. The extent to which a beam of light is bent or refracted when it passes from one substance into another depends on the change in concentration of the particular atoms in the path of the light, on the kind of atoms, and on the arrangement of atoms within the molecules. Unsaturation of carbon to carbon bonds is particularly susceptible to precise measurements employing the index of refraction. The table below gives the atomic refractions corresponding to typical unit groups commonly occurring in organic compounds:

TABLE I

Atomic refractions

| Group | $Mr_D$ |
|---|---|
| $CH_2$ | 4.618 |
| H | 1.000 |
| C | 2.418 |
| C=C double bond | 1.733 |
| O carbonyl | 2.211 |
| O hydroxyl | 1.525 |
| Cl | 5.967 |
| Br | 8.865 |
| I | 13.900 |
| C≡ | 5.459 |

It may be seen that there are wide differences in these refractive values $(Mr_D)$ so that compounds having various of such atomic constituents may be analytically measured with relative ease.

Hence the present method of measuring and continuously indicating the index of refraction is of importance in processes used in petroleum and chemical manufacturing. Examples of such processes are the manufacture of styrene from ethylbenzene by catalytic dehydrogenation, and also various cyclization, aromatization and other procedures in which the types of chemical bonds in the molecule are modified. The present method is also adaptable to the analysis of mixtures involving amines, nitroparaffins and halogen or nitrile substituted compounds. The system may also be used in conjunction with extraction operations such as are carried out in obtaining pharmaceutical products, and in the manufacture of lubricating oil from various petroleum fractions to secure the separation of paraffinic from naphthenic components which are known to differ widely in refractive index.

The prior art methods of measuring the index of refraction have utilized optical systems in which a beam of light is passed through various types of prisms and from a measurement of the emergent angle, and by instrument calibration or by calculation, obtaining the index of refraction for the particular material. Such indentification methods, however, are inadequate for industrial use. The present invention makes use of the change in direction of a beam of light passed through a hollow prism system, through which flows a continuous stream of the liquid being tested. The mechanical system herein described then makes use of the optical system of the invention to provide a continuous indicating or control means responsive to changes in the refractive index.

Figure 2:
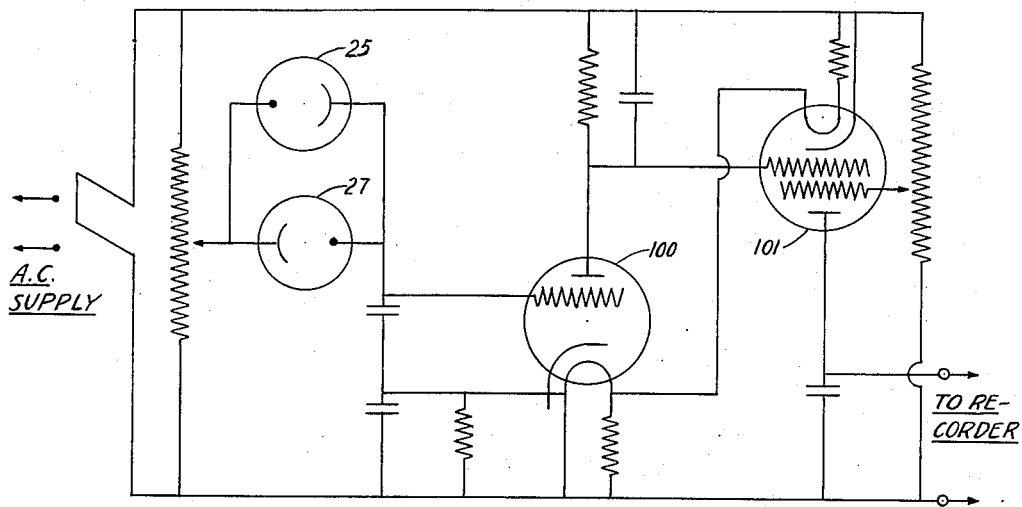
Figure 3:
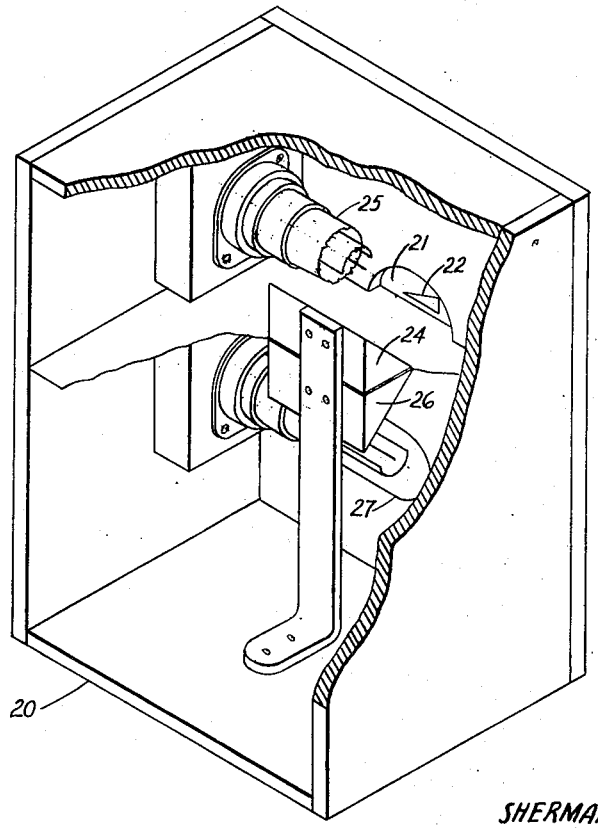

In the accompanying drawings in which an embodiment of the invention is illustrated, Fig. 1 is a diagrammatic view of the refractometric apparatus with certain of the parts shown broken away, Fig. 2 is a diagram of the electrical system of the refractometer, Fig. 3 is a view broken away and in section of a portion of the mechanism of the refractometer to show the photoelectric cells, and Fig. 4 is a perspective view broken away to show the mechanical linkage system and the actuating means thereof.

The present invention makes use of a light receiving system to indicate the angular displacement of the beam of light leaving the prism system through which the test liquid or gas is circulated. I prefer to direct the beam to a divided slit system, such as is shown in Fig. 1. This divides the beam into two portions for measurement by two photoelectric cells. However, a unitary cell, or so-called twin photoelectric cell such as the divided barrier layer type, may also be utilized.

The divided slit which accomplishes such a result may comprise two reciprocal openings or light receivers. By "reciprocal" I mean that the two units are so situated in the path of the light beam that any angular deviation thereof results in a decrease in the light going to one cell, with a reciprocal increase in the light going to the other. In the circumstances that the slit openings or the divided photocell portions are geometrically similar as well as reciprocal, a linear response of the light detecting system may be obtained. The means to accomplish this may be a pair of triangular slits as shown in Fig. 1, or any other reciprocal geometric construction. Thus, sectors of circles or other curves, unequal triangles or other wedge shaped figures may serve in this relationship. The edges facing each other may be parallel, but this is not essential.

Referring to Figs. 1 to 4, inclusive, the device embodying the present method comprises in general a light source, preferably monochromatic, 10 which is passed through a condensing lens 11, a slit 12, which may be adjustable or fixed as desired, and a collimating lens 13 to reach the prism system. While I may employ a single prism 14, I can also take advantage of the greater deviation which is made possible by the use of a plurality, such as the pair of prisms. The prisms are hollow so that the fluid may be passed therethrough, and are provided with a temperature control system 16, whereby the temperature of the fluid may be held constant throughout the measuring period. From the prism the refracted light passes through the condensing lens 17 as a narrow ribbon 18 and enters the detection system. The light detection system as shown in Fig. 3, includes a housing 20 and a slit plate holder 21, on which is mounted a slit system such as the two wedge slits 22 and 23. The beam of light 18 entering the slit system is there divided into two parts, which proceed, respectively, from said slits in part from an upper prism 24 to an upper light-responsive cell 25, and in part from a lower prism 26 which reflects to another light-responsive cell 27.

The reciprocal light openings or slits 22 and 23 are situated across the path of the ribbon of light leaving the prism. Consequently the angular displacement of the light as the refractive index changes, results in a sweeping of the ribbon across the light openings or slits. However, it is essential that some light pass to each one of the two openings regardless of the angularity of the light ribbon. The reciprocal relation thus maintains throughout the possible light-swept area, i. e., that a gain in light to one slit is accompanied by a loss of light to the other.

It is particularly important that the separation zone between the light-receptive elements be non-parallel with the plane of the ribbon of light. This condition is necessary to have some light enter each of said light-receptive units at all positions of the sweeping light beam. Thus the instrument is operative, even if the beam swings very suddenly, whereas a separation zone parallel to the ribbon could be missed entirely in a sudden swing too rapid for the instrument to follow.

Another advantage of the angularly inclined slit is that variations in slit width are of minor effect since the reciprocal relation of the light-receiving portions assures a clearly measurable effect. Even small changes in the ribbon of light 18 are accurately detected because of the differential nature of the change in light flux on the individual elements. Very narrow ribbons of light 18, which are desirable, may be used since the reciprocal elements are adapted to any width of the ribbon or beam.

By separating the light-receptive units by means of the above-described reciprocal elements 22 and 23, it is possible to isolate the photocells. This is advantageous since light-proof housings may then be used for the individual photoelectric cells; consequently, the effect of stray light may be reduced since it is possible to direct the light beams or ribbons through a mirror system from the respective reciprocal slits or openings 22 and 23 to the ultimate photoelectric cells. Another advantage of this system is that more sensitive cells may be utilized, since such cells are not subject to stray light but are completely shielded except for the above-described reciprocal portions of the light ribbon. Such an apparatus utilizing the principle of the invention also makes it possible to provide a more rugged form of apparatus for industrial applications.

In addition to the prism system to cause refraction of the light beam, I may also use a sequence of mirrors in conjunction therewith. Thus, the light path may be reflected serially from a series of mirrors preceding the entrance to the prism and also following the exit side of the prism. In this way it is possible to increase the transverse motion of the light beam per unit change of refractive index. By providing longer light paths it is therefore possible to increase the sensitivity of the method to a remarkable degree.

The electrical system delineated in Fig. 2 shows a typical amplifying circuit which I may utilize to amplify the differential current from photoelectric cells 25 and 27. These two cells are connected in opposition, so that the currents buck each other, and allow a differential current of positive or negative direction to be amplified. The resultant current may then drive a restorative mechanism described below. Tubes 100 and 101 are used in the electrical circuit, which may employ an A. C. source to give an output current suitable to actuate recorder and controller means.

In the preferred embodiment of the invention I utilize a mechanical linkage system, illustrated in detail in Fig. 4, in which deviation of the light beam as effected by changes in the refractive index creates an unbalance with respect to the two photoelectric cells resulting in a differential electric current which, after amplification, drives a motor 61, whereupon, through mechanical linkage as shown below, the slit assembly moves to restore the balance by lateral motion.

In Fig. 4, the mechanical linkage system is shown to comprise essentially a longitudinally moving thrust rod 50 travelling in bearings 51 and 52. The thrust rod has rigidly secured to it a yoke 53 spaced from another yoke 54. The latter is threaded to be engaged by the rotatable shaft or lead screw 55. A spring 56, to keep screw 55 from loose longitudinal motion, may also be provided and limit switches may also be used in this relationship to protect the apparatus. A series of gears turns shaft 55 by means of driven gear 57 attached thereto, and driving gear 58. The shaft of gear 58 is in turn rotated by gear 59 and worm gear 60, respectively. The shaft of gear 60 may be driven by suitable motive means such as a reversible motor 61. It is essential that a reversing motor be used to permit adjustment in each direction of the above drive system designated as 19 in Fig. 1, and illustrated in detail in Fig. 4, which moves the optical unit 20 of Fig. 1 back and forth until a balanced condition is attained. Such a state of balance need not consist of equality between the individual photocell readings, but may consist simply of a restoration to a particular predetermined condition resulting from the individual characteristics of the light-responsive means and/or amplifiers, and which is susceptible of reproducibility.

The lead-screw shaft 55 is secured in place by bearings 90 and 91 similarly to the bearings 51 and 52 of shaft 50. These bearings 90 and 91 permit rotational movement of shaft 55. The end assembly 92 functions as an end block to permit tightening of shaft 55 to prevent extreme longitudinal movement.

The gears 58 and 59 are maintained in position by bearings 80 and 81 which are coaxial with said gears 58 and 59.

The mechanical system of Fig. 4 also includes a connection of lead screw 55 by means of gears 70 and 71 to an electrical measurement unit, such as a long-path potentiometer 72. The type made available commercially with a helical winding, such as the Helipot, is suitable in this relationship. A similar connection may also be made to a synchronous repeater motor 73 such as the Selsyn type. This latter permits the balanced condition of mechanical linkage to be indicated as an angular setting, and by means of a conventional repeater motor circuit may be transmitted for indicator purposes to any desired number of "slave" motors from the master repeater motor 73. Thus the refractive index may be indicated and recorded at distant points with extreme accuracy.

The mode of operation of the entire apparatus may be summarized by following a change in refractive index in the liquid flowing through the prism system. The consequent change in refraction or bending of the light beam results in a difference in the relative current outputs from the two photocells. Such a current may be read directly as refractive index. In the preferred embodiment of the invention as shown in Figs. 1 to 4, the change in the photocell readings creates an unbalance, which is amplified. The amplified current may also be used to effect movement of a drive motor by conventional means such as a thyratron circuit. The motor movement then restores the system to a state of balance. The magnitude of the displacement may also be indicated as a change in refractive index of the test liquid, giving a direct dial or chart reading of refractive index or of the actual concentration of some component in the fluid mixture by a calibrating procedure.

In the recording instrument embodiment of the present invention, it is contemplated that the longitudinal motion effected on shaft 50 shall be transformed into rotary motion through gear 57 connected to said shaft 50. The rotative effect of gear 57 then drives a circular potentiometer such as a 10-turn helical potentiometer 72. This potentiometer is connected to the conventional amplification circuit to give an instantaneous indication as well as a permanent record when desired of the actual refractive index. The operation of this unit 72 may be explained as resulting in the transformation of a change of refractive index accomplishing longitudinal motion of shaft 50. Such longitudinal displacement which is necessary to achieve a balance of the divided wedge slits 22 and 23 situated in the light receiving assembly 20, also results in a displacement of said shaft 50. This actual displacement is accurately measured in terms of the rotation of the helical potentiometer, which mechanical motion is directly read as a new refractometer reading, which may be recorded if desired.

The present equipment may be used in connection with various types of indicating instruments which may be calibrated to read percentage composition directly. Automatic indicating potentiometers and direct reading electric instruments may also be employed with my invention. The amplifier circuit giving a variable voltage from the potentiometer circuit may be connected with a usual device, e. g., a potentiometer recorder for continuously indicating a direct reading in terms of the value being measured. Hence, the composition of the liquid may be determined continuously to indicate the efficiency of the process and quality of the product at all times.

The electrical energy developed or transmitted by the photoelectric cells may also be employed, preferably in amplified form, for controlling the temperature, pressure, rate of flow or other variable conditions of the system for handling, e. g., producing, utilizing, or distilling, etc. the mixture which is being analyzed. Ways and means for employing a variable energy output of any system to adjust and control one or more other variables of the system are well known in the art. Such known ways and means may be applied in conjunction with the method and apparatus herein disclosed to control the system for handling the mixture being analyzed in accordance with the composition of the latter so as to maintain uniform operation and results. The method may be applied in carrying out continuous distillations so as to vary the temperature or pressure or the amount of heat supplied to the still if necessary in order to maintain high efficiency.

The light source which I may employ in the present invention may be monochromatic, such as may be obtained from a sodium or mercury arc, or by the use of filters may utilize polychromatic sources as well. It is also contemplated that a modulated light source such as a gaseous discharge tube may be used with an alternating current. In this relationship the frequency may be controlled as desired, for example, to suppress harmonics which might otherwise be a disturbing influence.

In connection with the light source in the present invention, it is known that refractive indices have, in the past, been measured principally by the use of the sodium D line or the mercury line, such as are produced by electrical lamps employing these respective metallic vapors. It is also known that the specific dispersion may be employed by determining the refractive indices with different light sources and this variable has been correlated with the aromatic content of various hydrocarbon fractions. I may utilize a double system in carrying out my method, whereby such different light sources may be employed and directly compared to make use of the method of specific dispersion for certain mixtures. If desired, various filters producing monochromatic or narrowly defined wave lengths of light may be employed. The photoelectric or detector cells employed in the invention may be of conventional design. It is pointed out that the preferred embodiment of the invention avoids a weakness of prior art measurements using photocells, namely, the non-uniformity of the generating element in the cell. Whereas the movement of a slit of light across the photocell might otherwise result in unequal light at various parts of the element, I avoid this difficulty by using the mechanical balancing system, above described. Here the unbalance of the recording currents creates a differential current which drives a motor, and through mechanical linkage causes the slit assembly to restore the balance. Hence, such lateral motion is used as a measure of the change in refractive index.

In the present state of the art it is not possible to construct photocells of matched spectral consistency which will maintain constancy of output with continued use. This factor, coupled with differences in selective absorption of the light received from the respective optical paths to the two photocells or other light-receptive elements, renders the preferred embodiment of a mechanical return system extremely desirable. My invention makes it possible to eliminate such local variables, since the same portions of the photocells are always used at the reading position. Thus my invention is preferably carried out with multiple light-receptive units and since a fixed position is always restored at the time of reading, the errors of variable cell or receiving surface are not important. Variations in color transmission of the fluid, and in the intensity of the light source are also minimized by the present invention.

While it is possible to detect a shift in the narrow band or beam of light by utilizing two side-by-side light-receptive units, I prefer to employ the above-described slit system in which two reciprocal slits are situated in the optical path of the beam of light to divide said beam of light into reciprocal portions, i. e., portions so related that an increase in one portion of the beam is accompanied by a decrease in the remainder of the beam, and which portions are coupled to conventional devices for changing light fluctuations into electric currents.

It is also within the contemplation of the invention to combine the light-receptive units into a unitary device. A duplex-element photocell, or twin-element unit may be used to advantage. The advantage of a pair of light-sensitive elements rigidly mounted within one tube is the increase in physical stability of the apparatus as a whole. The use of this type of receiver requires that the light-sensitive elements which receive light from the slit shall have the elements constituted in reciprocal relationship.

The invention which I have described is based on the discovery that angular deviation of a beam of light resulting from changes in the refractive index of the test liquid may be continuously measured by the optical system which has been described. I have found that such angular deviation as effected on a beam of light passing through a hollow prism containing test liquid is analytically characteristic of the composition of such test liquids.

In view of the above, it will be seen that the several objects of the invention are achieved and other advantageous results obtained.

Since many changes could be made in the above methods and apparatus without departing from the scope of the invention, it is intended that all matter contained in the above description shall be interpreted as illustrative and not in a limiting sense, and that the invention is to be construed broadly and restricted solely by the appended claims.

What I claim, and desire to protect by Letters Patent of the United States, is:

1. A device for transforming changes in refractive index of a fluid into electrical currents which comprises in combination and in optical alignment, a source of radiation in the form of a narrow luminous ribbon, a hollow prism and means for passing fluid therethrough, means for producing a collimated beam of radiation from said source passing through said hollow prism, means for imaging the source upon two receiving slits in reciprocal relation in which angular deviation of said ribbon results in a gain of light to one slit and a decrease of light to the other of said slits, light-receptive elements associated with each of said slits for changing light into electric currents, differential means for balancing said electric currents, and means for effecting transverse movement of the said light-receiving slits and receptive means, said means for said transverse movement responding to the outputs of the two said light-responsive means which are connected in opposition, the connections from the outputs of the said light-receptive means to the electric driving means being such as to bring back the image of the ribbon of light to substantially the same position with respect to said reciprocal slits.

2. A device for transforming changes of refractive index of a fluid into electrical currents which comprises in combination and in optical alignment, a source of radiation giving a ribbon of light, a hollow prism, means for passing the said fluid which refracts the said ribbon of light through the said prism, a pair of photocells in combination with an aperture unit provided with respective wedge slits in reciprocal relation, each of said slits comprising a wedge-shaped light aperture, and each of said apertures being inversely positioned with respect to the other in a manner such that the wide end of one wedge is adjacent to the narrow end of the other, whereby each of said photocells associated with the said apertures always receives the said refracted ribbon of light, and such that a gain of light to one said photocell due to angular refraction of the said ribbon of light results in a decrease of light to the other of said photocells, means for producing a collimated ribbon of monochromatic radiation from said source passing through the hollow prism, and means for directing the refracted beam emerging from the prism to the said aperture unit, such that each of the said apertures and associated photocell always receives light in reciprocal relation, and a gain of light to one unit due to angular deviation of the beam results in a decrease of light to the other of said units, and the difference in light received by the said elements of the photocell yields an electrical output.

SHERMAN E. J. JOHNSEN.

References Cited in the file of this patent

UNITED STATES PATENTS

| Number | Name | Date |
| --- | --- | --- |
| 1,881,336 | Voigt | Oct. 4, 1932 |
| 1,894,132 | Stone | Jan. 10, 1933 |
| 1,905,251 | Styer | Apr. 25, 1933 |
| 1,939,443 | Geiselman | Dec. 12, 1933 |
| 2,059,736 | Gilbert | Nov. 3, 1936 |
| 2,065,365 | Doyle et al. | Dec. 22, 1936 |
| 2,350,001 | Akker | May 30, 1944 |
| 2,376,311 | Hood | May 15, 1945 |
| 2,410,550 | Padva | Nov. 5, 1946 |
| 2,413,208 | Barnes | Dec. 24, 1946 |
| 2,421,854 | Seaman | June 10, 1947 |
| 2,444,442 | Herbold | July 6, 1948 |
| 2,483,102 | Pierson | Sept. 27, 1949 |

FOREIGN PATENTS

| Number | Country | Date |
| --- | --- | --- |
| 555,928 | Great Britain | Sept. 13, 1943 |